(12) United States Patent
Jeong

(10) Patent No.: US 9,103,959 B2
(45) Date of Patent: Aug. 11, 2015

(54) LIGHTING DEVICE FOR VEHICLE

(71) Applicant: Hyundai Motor Company, Seoul (KR)

(72) Inventor: Byeongho Jeong, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 150 days.

(21) Appl. No.: 13/718,477

(22) Filed: Dec. 18, 2012

(65) Prior Publication Data

US 2014/0104862 A1    Apr. 17, 2014

(30) Foreign Application Priority Data

Oct. 15, 2012 (KR) .................. 10-2012-0114375

(51) Int. Cl.
*F21V 7/04* (2006.01)
*F21V 8/00* (2006.01)
*F21V 13/12* (2006.01)
*F21S 8/10* (2006.01)

(52) U.S. Cl.
CPC ............ *G02B 6/0096* (2013.01); *F21S 48/215* (2013.01); *F21S 48/2237* (2013.01); *F21S 48/2268* (2013.01); *F21S 48/2287* (2013.01); *F21S 48/23* (2013.01); *F21S 48/24* (2013.01); *F21V 13/12* (2013.01); *G02B 6/003* (2013.01); *G02B 6/002* (2013.01); *G02B 6/0031* (2013.01); *G02B 6/0036* (2013.01); *G02B 6/0055* (2013.01); *G02B 6/0076* (2013.01)

(58) Field of Classification Search
CPC ....... F21S 2/00; F21S 48/215; F21S 48/2225; F21S 48/2231; F21S 48/2237; F21S 48/23; F21S 48/24; F21V 1/00; F21V 2008/00
USPC ............ 362/244, 245, 249.01, 249.02, 296.1, 362/296.07, 311.12, 331, 335, 346, 507, 362/543, 545, 555, 556, 602, 606–613, 621, 362/623, 628, 311.07, 326–328, 347, 362/538–540, 558, 616
See application file for complete search history.

(56) References Cited

FOREIGN PATENT DOCUMENTS

| | | |
|---|---|---|
| JP | 2008-226788 A | 9/2008 |
| JP | 2009-26462 A | 2/2009 |
| JP | 2011-82066 A | 4/2011 |

*Primary Examiner* — Hargobind S Sawhney
(74) *Attorney, Agent, or Firm* — Morgan, Lewis & Bockius LLP

(57) ABSTRACT

A lighting device for a vehicle may include one or more light sources and one or more light conducting rods including a lens through which light radiated from the light source enters and a light outlet surface through which light entering an inside through the lens exits to an outside, in which the lens includes a light inlet surface configured to refract the light entering from the light source in parallel and a light outlet surface configured to collect parallel light passing through the light inlet surface to an upper portion of the light conducting rod, and a reflective body configured to reflect the light collected at the upper portion of the light conducting rod toward the light outlet surface of the light conducting rod may be installed on the light conducting rod, thereby improving light efficiency.

11 Claims, 3 Drawing Sheets

LIGHTING DEVICE FOR VEHICLE

CROSS-REFERENCE TO RELATED APPLICATION

The present application claims priority to Korean Patent Application No. 10-2012-0114375 filed on Oct. 15, 2012, the entire contents of which is incorporated herein for all purposes by this reference.

BACKGROUND OF THE INVENTION

1. Field of the Invention

The present invention relates to a lighting device for a vehicle, and more particularly, to a lighting device for a vehicle employing one or more light conducting rods.

2. Description of Related Art

A lighting device for a vehicle employing a light conducting rod in a related art includes a light conducting rod including one or more light inlet surfaces and one or more light outlet surfaces, and one or more light sources.

Each of the light inlet surface and the light source are inclinedly formed with respect to an axis in a longitudinal direction of the light conducting rod, and an incline direction of the light inlet surface with respect to the axis in the longitudinal direction of the light conducting rod is formed to be opposite to an incline direction of the light source.

The one or more light conducting rods are disposed in parallel to each other.

In the lighting device for the vehicle employing the light conducting rod having the aforementioned structure, a plurality of light sources may be arranged on one plane, so that it is possible to use a circuit substrate having a simple structure and it is easy to assemble the lighting device, thereby improving productivity and reducing manufacturing costs.

However, when the light conducting rod having the inclined light inlet surface is manufactured by a mold, there is a possibility in that a problem is generated in the mold or in an injection quality of the light conducting rod.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lighting device for a vehicle having advantages of easily injection molding manufacturing a conducting rod, having no concerns of deterioration in strength of a mold in spite of a repeated injection molding manufacturing, and improving light efficiency because light radiated from a light source is concentrated at a focus formed inside the light conducting rod and then is distributed by total reflection.

Further, various aspects of the present invention are directed to providing a lighting device for a vehicle having advantages of contributing to reduce power consumption, weight, and a cost of the lighting device by decreasing the number of necessary light sources by distributing light radiated from one light source with two light conducting rods and making the distributed light be incident.

In an aspect of the present invention, a lighting device for a vehicle may include a light source, and a light conducting rod having a lens through which light radiated from the light source enters, and a first light outlet surface through which light entering inside through the lens exits to an outside of the light conducting rod, wherein the lens may include a light inlet surface refracting the light entering from the light source in parallel, and a second light outlet surface collecting parallel light passing through the light inlet surface to a portion of the light conducting rod, and a reflective body reflecting the light collected at the portion of the light conducting rod toward the first light outlet surface of the light conducting rod.

The reflective body is installed on the light conducting rod.

The light inlet surface and the second light outlet surface are formed so as to may have a curvature of a hyperbola.

The reflective body may include a reflex reflector configured to reflect an incident light.

The light source is disposed co-axially in a longitudinal direction of the light conducting rod.

The first light outlet surface is formed at a position facing the portion of the light conducting rod.

The light source is positioned at a focus of the light inlet surface.

In another aspect of the present invention, a lighting device for a vehicle, may include a light source, a first reflective body shaped of a parabola and reflecting incident light emitted from the light source, a second reflective body shaped of a parabola and reflecting the incident light reflected from the first reflective body in parallel, and two light conducting rods changing a direction of light reflected from the second reflective body to be incident in parallel to a longitudinal direction of the two light conducting rods, wherein a focus of the parabola of the first reflective body is the same as a focus of the parabola of the second reflective body, and wherein the light source is positioned at a focus of a parabola forming a hyperbola together with the parabola of the first reflective body.

The second reflective body may include an opening to receive the light from the light source.

Respective two light conducting rods are formed to may have different lengths.

The respective two light conducting rods are formed in a shape of a rectangle.

A third reflective body changing a direction of light incident in parallel to the longitudinal direction of the two light conducting rods, is installed inside each of the two light conducting rods.

The third reflective body is formed so as to extend from one vortex of a rectangle to another vortex in a diagonal direction of the rectangle.

The third reflective body may include a reflective surface shaped of saw teeth and changes the direction of the light incident in parallel to the longitudinal direction of the two light conducting rods.

The reflective surface is disposed at 45 degrees with respect to an incident light.

According to an exemplary embodiments of the present invention, since the light inlet surface of the light conducting rod is formed as a curved surface, it is possible to increase an injection size when the light conducting rod is injection molded by a mold, thereby easily injection molding manufacturing the light conducting rod and improving durability of the mold of the light conducting rod.

The light radiated from the light source is concentrated at a focus formed inside the light conducting rod and then distributed to the inside of the light conducting rod by total reflection, thereby improving light efficiency.

Further, it is possible to distribute light with the two light conducting rods by using one light source, thereby reducing the number of necessary light sources for constituting the lighting device for the vehicle, decreasing power consumption of the light source, and contributing to decrease costs.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
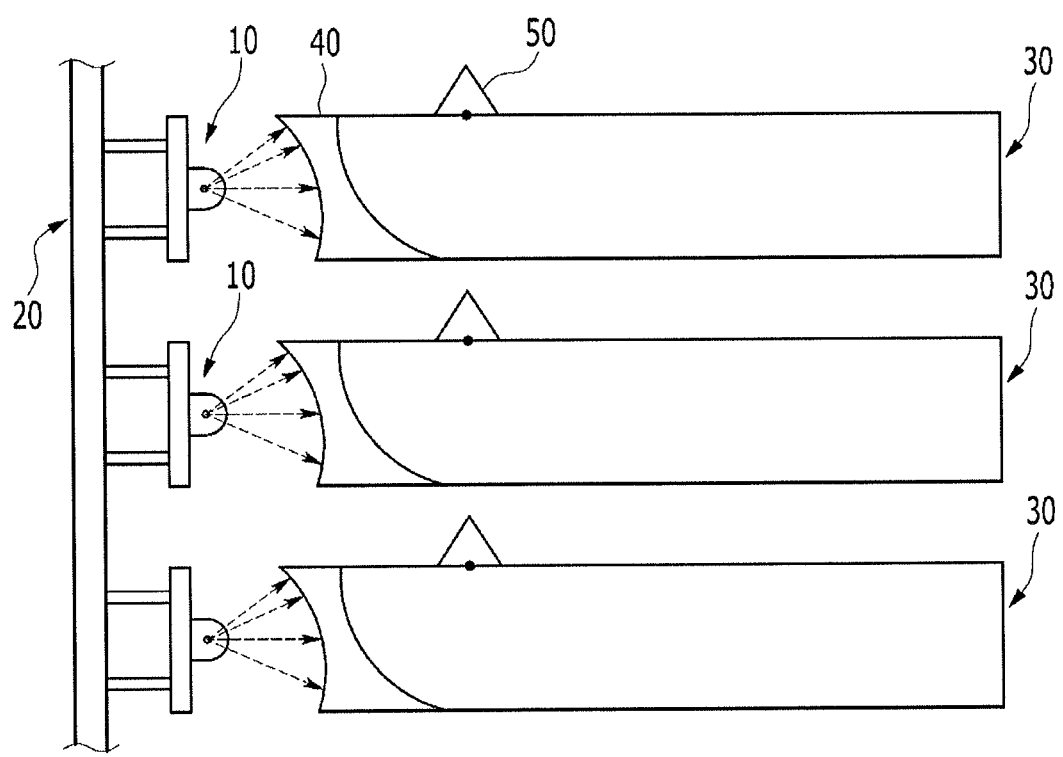
FIG. 1 is a front view of a lighting device for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 2:
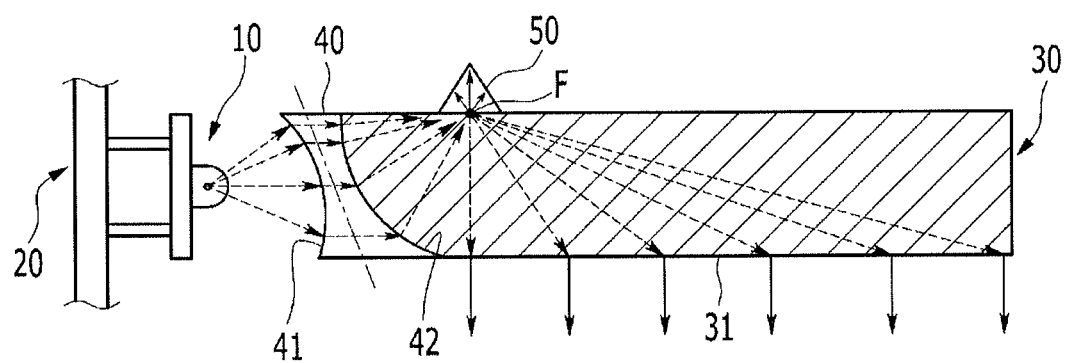
FIG. 2 is a cross-sectional view of a lighting device for a vehicle according to an exemplary embodiment of the present invention.

Referring to FIGS. 1 and 2, a lighting device for a vehicle according to an exemplary embodiment of the present invention includes one or more light sources 10.

The one or more light sources 10 are installed at the same substrate 20.

The light source 10 may be formed of, for example, an LED.

One or more light conducting rods 30 are arranged while being adjacent to the light sources 10.

One light conducting rod 30 is disposed in correspondence to one light source 10.

The light source 10 is positioned on an axial line of a longitudinal direction of the light conducting rod 30.

A lens 40 is formed at an entrance of the light conducting rod 30 which light radiated from the light source 10 enters.

The lens 40 includes a light inlet surface 41 formed at the entrance of the light conducting rod 30 and a light outlet surface 42 through which light passing through the light inlet surface 41 exits.

Each of the light inlet surface 41 and the light outlet surface 42 is formed concavely so as to have a curvature of a hyperbola.

The light source 10 is positioned at a focus of a parabola formed by the light inlet surface 41.

A curvature of a parabola of the light outlet surface 42 is formed so that a focus F of a parabola formed by the light outlet surface 42 is positioned on the light conducting rod 30.

That is, since the light conducting rod has a limited size, a predetermined point on the light conducting rod 30 is set as a reference, the light outlet surface 42 is formed with the curvature of the parabola formed so that the predetermined point serves as the focus, the light inlet surface 41 is formed with the curvature of the hyperbola corresponding to the parabola of the light outlet surface so that the light inlet surface 41 has the curvature of the parabola, and the light source 10 is set to be positioned at the focus formed by the parabola of the light inlet surface 41.

As described above, when the lens 40 having the curvature of hyperbola is formed at the light conducting rod 30, the light radiated from the light source 10 is converted to parallel light while passing through the light inlet surface 41 of the lens 40 and the parallel light is collected at the focus F while passing through the light outlet surface 42 as illustrated in FIG. 2.

A publicly known reflex reflector 50 for totally reflecting the incident light is installed at the focus F.

Accordingly, the light collected at the focus F is reflected toward the light outlet surface 31 of the light conducting rod 30 by the reflex reflector 50 and then exits to the outside of the light conducting rod 30 through the light outlet surface 31.

Figure 3:
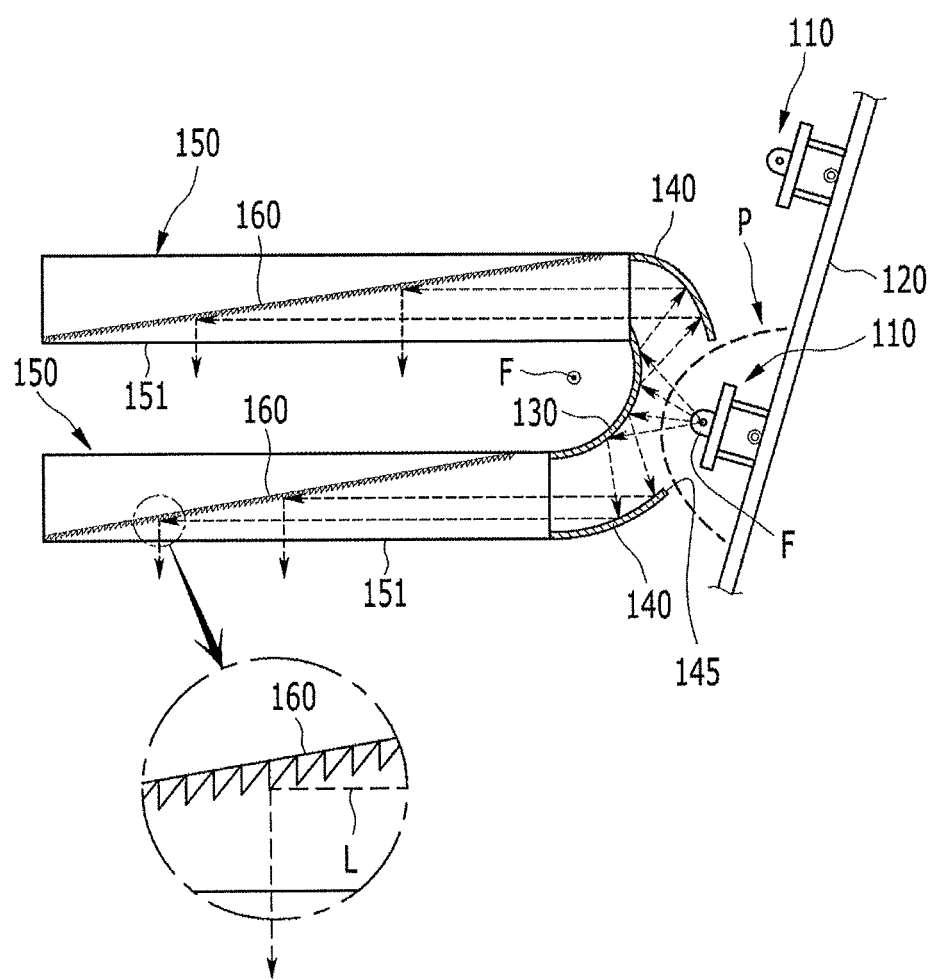
FIG. 3 is a front view of a lighting device for a vehicle according to another exemplary embodiment of the present invention.

Referring to FIG. 3, a lighting device for a vehicle according to another exemplary embodiment of the present invention includes one or more light sources 110.

The one or more light sources 110 are installed so as to be positioned on one plane of a circuit substrate 120.

The circuit substrate 120 may be installed so as to be inclined at a predetermined angle.

A first reflective body 130 shaped like a parabola for reflecting incident light emitted from the light source 110 is installed adjacently to the light source 110.

A second reflective body 140 shaped like a parabola for reflecting incident light reflected from the first reflective body 130 in parallel is installed.

In an exemplary embodiment of the present invention, the second reflective body 140 may include an opening 145.

The lighting device for the vehicle includes two light conducting rods 150 for switching light, which is reflected from the second reflective body 140 to be incident in parallel, in a perpendicular direction and emitting the switched light.

The first reflective body 130 has a curvature of the parabola. The first reflective body 130 is formed so that a focus F of the parabola is formed between the two light conducting rods 150.

The second reflective body 140 is formed with a curvature of the parabola so as to have the same focus as the focus F.

Accordingly, the light emitted from the light source 110 to the first reflective body 130 through the opening 145 is reflected to the second reflective body 140 by the first reflective body 130, and the light reflected to the second reflective body 140 is divided and enters the two light conducting rods 150.

The light source 110 is positioned at the focus F of the parabola P forming a hyperbola together with the parabola formed by the first reflective body 130.

The two light conducting rods 150 are formed so as to have different lengths. Since light radiated from one light source 110 may enter the two light conducting rods 150 having the different lengths, it is possible to reduce power consumption of the light source and contribute to reduce costs.

Each light conducting rod 150 is formed in a rectangle shape.

A third reflective body 160 for switching a direction of light that is reflected by the second reflective body 140 and then incident in parallel to a perpendicular direction is installed inside each light conducting rod 150.

The third reflective body 160 has a reflective surface having saw teeth, and the reflective surface is formed to have an angle of 45 degrees with respect to incident light L.

Accordingly, the direction of the incident light L incident to the reflective surface is switched to the perpendicular direction to exit to the light outlet surface 151 of the light conducting rod 150.

The third reflective body 160 is formed so as to extend from one vertex of a rectangle formed by the light conducting rod 150 to another vertex in a diagonal direction.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lighting device for a vehicle comprising:
    a light source; and
    a light conducting rod having:
        a lens through which light radiated from the light source enters; and
        a first light outlet surface through which light entering inside through the lens exits to an outside of the light conducting rod,
    wherein the lens includes:
        a light inlet surface refracting in parallel the light entering from the light source; and
        a second light outlet surface collecting parallel light passing through the light inlet surface to a portion of the light conducting rod, wherein the portion of the light conducting rod is located at a first focus of light passing through the second light outlet surface, and
    a reflective body reflecting the light collected at the portion of the light conducting rod toward the first light outlet surface of the light conducting rod,
    wherein the reflective body is installed on the surface opposite the light-emitting surface of the light conducting rod,
    wherein the light inlet surface and the second light outlet surface are formed so as to have a curvature of a hyperbola, and
    wherein the light source is positioned at a second focus of the light inlet surface.

2. The lighting device of claim 1, wherein the light source is disposed co-axially in a longitudinal direction of the light conducting rod.

3. The lighting device of claim 1, wherein the first light outlet surface is formed at a position facing the portion of the light conducting rod.

4. A lighting device for a vehicle, including:
    a light source;
    a first reflective body shaped of a parabola and reflecting incident light emitted from the light source;
    a second reflective body shaped of a parabola and reflecting the incident light reflected from the first reflective body in parallel; and
    two light conducting rods changing a direction of light reflected from the second reflective body to be incident in parallel to a longitudinal direction of the two light conducting rods,
    wherein a focus of the parabola of the first reflective body is the same as a focus of the parabola of the second reflective body; and
    wherein the light source is positioned at a focus of a parabola forming a hyperbola together with the parabola of the first reflective body.

5. The lighting device of claim 4, wherein the second reflective body includes an opening to receive the light from the light source.

6. The lighting device of claim 4, wherein respective two light conducting rods are formed to have different lengths.

7. The lighting device of claim 4, wherein the respective two light conducting rods are formed in a shape of a rectangle.

8. The lighting device of claim 4, wherein a third reflective body changing a direction of light incident in parallel to the longitudinal direction of the two light conducting rods, is installed inside each of the two light conducting rods.

9. The lighting device of claim 8, wherein the third reflective body is formed so as to extend from one vortex of a rectangle to another vortex in a diagonal direction of the rectangle.

10. The lighting device of claim 9, wherein the third reflective body includes a reflective surface shaped of saw teeth and changes the direction of the light incident in parallel to the longitudinal direction of the two light conducting rods.

11. The lighting device of claim 10, wherein a longest side of the reflective surface is disposed at 45 degrees with respect to a direction of an incident light.

\* \* \* \* \*